Patented July 2, 1946

2,403,052

UNITED STATES PATENT OFFICE 2,403,052

METHOD FOR EFFECTING CATALYTIC DEHYDROGENATION PROCESSES

Robert M. Cole and Irving I. Shultz, Long Beach, Calif., assignors to Shell Development Company, San Francisco, Calif., a corporation of Delaware No Drawing. Application July 17, 1942, Serial No. 451,372

6 Claims. (Cl. 260—683.3)

This invention relates to an improved method for effecting known catalytic dehydrogenation processes of a specific type wherein sulfur-bearing organic reactants are dehydrogenated in the vapor phase with regenerative heavy metal oxide catalysts. A particular aspect of the invention relates to an improvement in the method of effecting the catalytic dehydrogenation of sulfur-bearing hydrocarbon fractions. A further more particular aspect of the invention relates to an improvement in the method for effecting the catalytic dehydrogenation of gaseous hydrocarbons in the presence of controlled concentrations of sulfur compounds.

As is known, various processes for the dehydrogenation of organic materials have been developed which involve the use of sulf-active heavy metal oxide catalysts. These catalysts, when used under conditions where their dehydrogenating properties come into play, involve the use of a short cycle regenerative process. This involves the use of short process or conversion periods followed by short periods of regeneration wherein carbonaceous deposits are removed from the catalyst by burning. The technique of the short cycle regenerative process has been highly developed. It is this type of process to which the process of the present invention relates.

The process of the invention may be stated to be applicable and generally advantageous in any of the known processes for dehydrogenating organic materials wherein sulf-active heavy metal oxide catalysts having dehydrogenating properties are employed in a short cycle regenerative manner. Except for the variations hereinafter more particularly described, these various processes, when effected according to the process of the invention, are otherwise carried out as heretofore under known suitable conditions, both in regard to the process proper and the periodic regeneration of the catalyst. In its broader aspects the process may, in general, be advantageously applied in the treatment of any vaporizable carbonaceous reactant which it may be desired to dehydrogenate with the aid of a regenerative heavy metal oxide catalyst of the class described. While the treatment of heterocyclic compounds, olefin oxides, amines, amides, alcohols, ketones, aldehydes, and the like constitute important applications of the process, the most important application will be in the catalytic dehydrogenation of vaporizable hydrocarbons. Thus, the process is particularly adapted for the dehydrogenation, cyclization, and reforming of various hydrocarbons and hydrocarbon fractions. A few such conversions are, for example, the conversion of ethane to ethylene, the conversion of propane to propylene, the conversion of butane to butylene, the conversion of butylene to butadiene, the conversion of heptane to toluene, the conversion of indene to chrysene, the conversion of butyl benzene to naphthalene, the conversion of acenaphthene to acenaphthylene, the conversion of isopropyl benzene to methyl styrene, the conversion of cyclopentane to cyclopentadiene, the reforming of petroleum fraction, and the like.

The catalysts employed for the treatment of these various materials in the described manner are of the metal oxide type and comprise one or a mixture of difficultly reducible heavy metal oxides having dehydrogenating properties. They tend, when used under the usual conditions, to primarily affect the C—H bond rather than the C—C bond and in this respect they differ from the usual cracking catalysts which also frequently comprise oxides of metals and metalloids. One of the distinguishing characteristics of these catalysts is that their dehydrogenating properties are sensitive to water vapors. Although traces of water vapor (in distinction from perfect dryness) appear to be essential, even traces of water (in the ordinary sense) are sufficient to cause a substantial or even a complete loss of their dehydrogenating activity. In this respect also these catalysts differ from the catalysts developed for the catalytic cracking of hydrocarbons. Another characteristic of these catalysts is their sulfur sensitivity. They are not appreciably affected by the sulfur impurities usually encountered in the various organic reactants. In this respect they differ from many of the dehydrogenating metal catalysts such as nickel, platinum, etc. Another characteristic of these catalysts is that when used under operating conditions they cause a substantial deposition of carbon and/or carbonaceous deposits with a consequent relatively rapid drop in the catalytic activity. Catalysts of this type having the above characteristics are, for the purpose of designation, hereinafter referred to as "water-sensitive heavy metal oxide dehydrogenation catalysts." Particular catalytic agents of this type, for the use of which the process of the invention is especially advantageous, are the oxides of Ti, V, Cr, and Mn. The process of the invention is also particularly advantageous when using catalysts comprising the oxides of Cr, Mo, W and U. Perhaps the two most important of these agents are the oxides of Cr and Mo.

These preferred heavy metal oxides as well as other less preferred metal oxides of the type described may be employed per se, but are usually employed in combination with an inactive or relatively inactive support such, in particular, as alumina, magnesia, or the like. They may, however, be used in other known forms such, for instance, as mixed gels with alumina, silica, or the like. Also, instead of being used in the form of granules, pellets or the like, they may be used in the form of a fine powder. Furthermore, they may be promoted and/or stabilized, if desired, by various other materials such, for instance, as the oxides of Li, Na, K, Ca, Mg, Ba, the rare earths, Pt, Bi, or other known agents.

When effecting the conversion of these various organic reactants with water-sensitive heavy metal oxide dehydrogenation catalysts according to the process of the invention, the reaction conditions, as well as the regeneration conditions, are maintained as usual. Thus, the various temperatures, pressures, space velocities, gas recycle, regeneration control, etc. are essentially those known to be suited for the various treatments contemplated. In these processes and as a consequence of the elevated temperatures employed and the dehydrogenating activity of these catalysts, carbon and/or carbonaceous deposits relatively quickly coat the catalyst surface and cause a substantial decrease in the activity of the catalyst. This makes a short cycle regenerative process necessary. In some cases it is necessary or advisable to employ process periods of only an hour or less whereas in other cases process periods up to about two days are practical. In any case it is necessary to regenerate the catalyst many times before it is discarded or reworked into an essentially new catalyst. In general, the advantage of the process of the invention is proportional to the frequency of the catalyst regeneration.

The regeneration of the catalyst is effected in the known manner by burning the deposited carbonaceous material with a combustion-supporting gas such, for instance, as air diluted with nitrogen, carbon dioxide, flue gas, or the like. Since, as pointed out above, these catalysts are sensitive to water vapors, the gas used for the regeneration is maintained essentially dry. A mixture of air and steam or a wet regeneration gas, although suitable for regenerating certain other types of catalysts, causes a substantial decrease of the catalytic activity of catalysts of the present type. This deactivation, although temporary, causes decreased conversions and is to be avoided.

Aside from the temporary deactivation of these catalysts due to carbon deposition or other causes, the catalysts undergo a gradual permanent decline in activity with use. The active life of the catalyst depends upon the rate of the deactivation, and when the catalytic activity has dropped to a certain arbitrary point, it is necessary to discard the catalyst, treat it to recover valuable components, or to subject it to a more involved treatment to restore it to its original condition. Generally speaking, with the better of the newly developed catalysts, this rate of catalyst decline is relatively slow, a given batch of catalyst allowing, for instance, several hundred process and regeneration cycles. These catalysts are, however, relatively expensive. As a result, the catalyst replacement cost represents one of the major cost items in the use of processes of the type in question and every effort is made to extend the active life of the catalyst as far as possible consistent with economical conversions.

An object of the invention is to provide an improved method whereby these various organic materials which contain sulfur and/or sulfur compounds may be catalytically dehydrogenated with these regenerative metal oxide catalysts with better and more sustained conversions. Another object of the invention is to provide a method whereby the active life of the described metal oxide catalysts used in short cycle regenerative processes may be increased. A still further object of the invention is to provide an improved method for the catalytic dehydrogenation of hydrocarbons such, in particular, as normally gaseous hydrocarbons in the presence of controlled concentrations of sulfur.

We have been actively engaged for some time in the development and perfection of processes of the type in question and have found that the rate of decline of the catalyst activity is due to at least three separate causes. The first of these causes of deactivation is generally known and is the gradual sintering or recrystallization of the active catalytic agent. This is due to the relatively high temperatures encountered in the process, particularly during the regeneration. The deactivation of the catalyst due to this cause cannot be eliminated but is maintained at a minimum by employing stabilized catalysts and carefully controlling the temperatures. A second cause of deactivation of the catalyst is, we have found, due to poisoning of the catalyts by traces of iron or iron compounds transferred to the catalyst from various portions of the plant and particularly from the reactor vessel itself. This can be largely avoided by employing reactors lined with nonferrous materials and protected by efficient filters. Since, however, these processes are endothermic and usually require efficient transfer of heat to the catalyst through the confining walls and also since these processes are often executed under pressure, it is generally necessary from practical and engineering considerations to employ ferrous metal equipment. The most practical means of preventing transfer of iron to the catalyst is, we have found, by the use of certain specific concentrations and types of sulfur compounds in the feed. This is the subject matter of U. S. Patent 2,269,028, U. S. Patent 2,305,538, U. S. Patent 2,322,857, and co-pending application Serial No. 436,618, filed March 28, 1942. As more fully described in the above-mentioned patent and copending applications, the rate of transfer of iron to the catalyst is high in the absence of sulfur in the feed, is at a minimum between certain low concentrations of sulfur, and is high with higher sulfur concentrations. The concentration of sulfur, in order to maintain transfer of iron at a minimum, is preferably maintained between about 0.0006% and 0.05% by weight, preferably with a feed dried to a water content below 0.005% by weight.

A third cause of the deterioration of the catalytic activity with use, we have found, is due to poisoning of these catalysts with sulfur dioxide. This, as far as we are aware, has never been appreciated heretofore. Sulfur dioxide when present in very small amounts exerts an overall beneficial effect due to its ability to repress the above-described contamination of the catalyst by iron. When present in more than traces, however, it exerts a very detrimental effect. This detrimental effect is believed to be due to a specific poisoning effect in the catalyst (probably due to absorption on the active centers), to the tendency of appreciable concentrations of sulfur dioxide to induce iron transfer, and to the tendency of sulfur dioxide to catalyze changes in the catalyst. As an example of this last cause, we may mention the transformation of gamma alumina into the inactive alpha form. Most of the best catalysts of this type comprise alumina in the form of a gel or a support. This alumina in the active catalyst is in the gamma form. At elevated temperatures this alumina gradually is converted to the alpha form and, as this takes place, the activity of the catalyst falls off. Sulfur dioxide is an active catalyst for this undesired transformation. Similar rearrangements of other metastable components of these catalysts are also no doubt accelerated by the presence of sulfur dioxide.

Sulfur dioxide is not present per se in any of the usual reactants treated according to the methods above described. It is found, however, that when feeds containing sulfur are treated according to the process of the type in question at temperatures of 540° F. or above, a certain amount of sulfur is taken up by the catalyst during the process period. Upon subsequent regeneration this sulfur is oxidized to sulfur dioxide. As a consequence, the catalyst during each regeneration is subjected at high temperatures to a gas containing considerable concentrations of sulfur dioxide. When the catalyst is subjected to frequent high temperature regenerations, as is the case when operating in a short cycle regenerative manner, this causes a considerable detrimental effect upon the catalyst. In practice this condition is furthermore usually aggravated by the fact that the regeneration gas is usually air diluted with spent regeneration gases. In the usual practice, therefore, the concentration of sulfur dioxide in the recycled regeneration gas builds up to a relatively high value. In many cases, especially when treating feeds containing high concentrations of sulfur impurities, this concentration is so high that severe corrosion problems are encountered and it is necessary to forego recycling of the spent regeneration gas and to provide means for burning sulfur-free gas to supply an inert gas with which to dilute the air for regeneration.

While the detrimental effect of sulfur dioxide thus formed is particularly pronounced when treating feeds normally containing appreciable concentrations of sulfur, for instance 0.1% by weight or over, it is also present to a lesser but significant extent when employing feeds containing low and controlled amounts of sulfur (either naturally present or added) according to the teachings of the above-said patent and copending applications. Thus, in these processes, although the concentrations of sulfur in the feed are very low and the overall effect of this sulfur is decidedly advantageous, the appreciable concentration of sulfur dioxide formed in the regeneration step nevertheless exerts its detrimental effects. Thus, in the described methods of inhibiting iron transfer, in order to achieve an important advantage, a lesser disadvantage is created. According to the process of the present invention, when employing the preferred controlled concentrations of sulfur in the feed this disadvantage is obviated. Consequently, the methods of the above-mentioned patent and copending applications may be most advantageously applied when using the process of the present invention and this application of the process constitutes a preferred embodiment of the invention.

The detrimental effect of sulfur dioxide upon the catalyst is almost completely avoided, according to the present process, and this is accomplished by treating the catalyst after the process step, but before the regeneration step, with water vapor, as hereinafter described. We have found that by treating the catalyst with water vapor under suitable conditions just prior to the regeneration step the bulk of the sulfur may be eliminated from the system in the form of hydrogen sulfide. Thus, by this treatment the sulfur is removed from the system and substantially no sulfur dioxide is formed. Not only is the rate of decline of the catalytic activity decreased, but undesirable concentrations of sulfur in the regeneration gases are avoided and the spent regeneration gas is rendered much more suitable for recycling.

After completion of the process period the catalyst is preferably freed of residual reactant vapors by means of a short purge and/or by the application of suction. Since in short cycle operation the regenerations are frequent, the recovery of residual reactant vapors reduces the process losses considerably. In many cases, however, where the reactant is relatively inexpensive the amount of reactant recovered may not warrant the expense of a separate purge step and it may therefore be neglected.

The catalyst either with or without pre-removal of residual reactant vapors is treated with water vapor. Under suitable conditions a reaction occurs whereby sulfur taken up by the catalyst is converted to hydrogen sulfide. In order to allow the reaction to proceed in the desired direction, it is desirable to continuously remove the hydrogen sulfide as it is formed. This may be conveniently effected by passing a stream of water vapor through the catalyst.

The rate of the sulfur removal, as well as the efficiency of the sulfur removal, by the treatment is, we have found, dependent upon several variables such as the length of time of the treatment, the temperature of the treatment, and the concentration of water vapor applied. Consequently, in order to obtain the optimum results these variables are preferably maintained between certain practical limits. It will be understood, however, that factors such as the concentration of sulfur in the reactant, the length of the process period, and the character of the particular catalyst employed govern the amount of sulfur which is to be removed and also, to a certain extent, the ease with which it can be removed, and that therefore the conditions suitable for the removal of sulfur by the treatment with water vapor will vary considerably depending upon the particular circumstances.

The treatment may, if desired, be effected with ordinary or superheated steam. Since, however, the treatment is preferably effected with a continuous flow of water vapor and the treatment generally requires some time, this may require an excessive steam consumption. It is found that equivalent results may be obtained more economically by the use of a diluted steam, for instance a mixture of an inert gas such as flue gas, nitrogen or the like with steam. The concentration of steam in such mixtures may vary as desired and may be as low as about 1%. However, since, as pointed out below, the use of such low concentrations of steam requires a much longer treatment, the concentration of steam is usually at least 2% and is preferably higher.

The rate of the desulfurization reaction and also, to a certain extent, the completeness of the desulfurization are roughly proportional to the concentration of water vapor applied and the rate at which it is applied (the space velocity). Thus, the extent of the desulfurization is, under otherwise comparable conditions, roughly proportional to the amount of water vapor applied. By applying high concentrations of water vapor and/or by passing the water vapor through the catalyst at a high space velocity, the maximum rate of the desulfurization and/or the maximum degree of the desulfurization can be obtained. In general, it is found that with catalysts containing a relatively small concentration of sulfur, for example in the order of 0.02 pound per cubic foot of catalyst, a substantial desulfurization may be effected with diluted steam containing as little as about 10 volumes of water vapor per volume of catalyst. Thus, for example, a chromium oxide/alumina catalyst, used in the dehydrogenation of propane containing 0.03% sulfur by weight (in the form of added thiophene, with a process period of 40 minutes) and therefore containing only a relatively small concentration of sulfur, is approximately 27% desulfurized by passing diluted steam containing 9 volumes of water vapor through the catalyst at a space velocity of 24 in a period of 10 minutes. In order to effect a desulfurization of over 50%, however, even with catalysts containing relatively small amounts of sulfur, the amount of water vapor required is, in general, over 16 volumes per volume of catalyst, and in order to effect a substantially complete desulfurization, even with catalysts containing only relatively small amounts of sulfur, the amount of water vapor required is much higher, for example 36 or more volumes per volume of catalyst. In most cases where the concentration of sulfur in the catalyst is larger, the amount of water vapor required is even larger. Also, when pure undiluted steam is applied, a large amount of the water vapor is not reacted and in such cases the amount of water vapor necessary to effect the desired degree of desulfurization under otherwise comparable conditions is even larger, for instance 200–1000 volumes of water vapor. Except for the small waste of steam, the use of excess water vapor is in no way detrimental.

As the desulfurization treatment progresses the rate of the desulfurization reaction gradually decreases. The rate of sulfur removal may be easily followed by observing the concentration of hydrogen sulfide in the excess treating gas.

The treatment may be suitably effected at temperatures ranging from about 500° F. to about 1500° F. In general, however, it is most practical to effect the treatment at temperatures at or near those applied in the conversion, thus eliminating the necessity of changing the temperature of the catalyst and converter at the end of each process period. Thus, in general, temperatures between about 800° F. and 1200° F. will be found most suitable. Within these ranges the lower temperatures are preferred.

The treatment is preferably carried out under such conditions and for such a time as to effect a substantial removal of the sulfur. This, in general, may be effected in a few minutes providing that the concentration of water vapor, the space velocity and other conditions are favorable. In order to effect a desulfurization in the shortest possible time, it is preferable to employ space velocities (volumes of gas per volume of catalyst per minute) of at least 20 and preferably higher. For example, the desulfurization may usually be effected in a few minutes at space velocities of about 70.

According to a preferred embodiment of the invention, the desulfurization is carried out to such an extent that the sulfur dioxide in the regeneration gas in the subsequent regeneration step is between about 0.0006% and 0.0012% by weight. This concentration of sulfur dioxide in the regeneration gas in combination with about 0.002% by weight sulfur in the feed gives exceptionally advantageous results. With a chromium oxide/alumina catalyst containing about 0.02 pound of sulfur per cubic foot of catalyst, this concentration of sulfur dioxide in the regeneration gas is established when the desulfurization is carried out to about 75%–95% of completion. Thus, after the desulfurization treatment the catalyst contains about .001–.005 pound of sulfur per cubic foot.

In such cases where a preliminary purge of the catalyst has not been employed, it is sometimes possible to recover small amounts of reactants from the products of the water vapor treatment. In most cases, however, this is not warranted.

The above-described treatment of the catalyst with water vapor to remove sulfur does not remove any appreciable amount of the carbonaceous deposits from the catalyst and is in no sense a reactivation or regeneration treatment. As pointed out above, these catalysts are sensitive to water vapor and are temporarily poisoned by the described treatment. Thus, if the catalyst, after the above-described treatment with water vapor, is put back on stream it is found that it is substantially inactive.

The catalyst after it has been treated with water vapor as above-described is then subjected to a conventional regeneration treatment such as described above for the removal of the carbonaceous deposits. As explained above, this regeneration is effected with the usual substantially dry regenerating gases. It is found that this regeneration, besides serving its usual function of removing carbonaceous deposits, also substantially destroys the poisoning action of the water vapor used in the preceding step. This is no doubt due to removal of traces of adsorbed water from the catalyst. Although the regeneration largely overcomes this detrimental effect of the steam treatment, it often does not overcome it completely. It is therefore advantageous after the catalyst has been regenerated to pass a relatively dry inert gas through the catalyst for a short time. This relatively dry inert gas may be from a separate source or it may be the regeneration gas itself. Thus, the regeneration gas may be recycled for a period without adding further quantities of air or oxygen after the regeneration is substantially complete. During the recirculation small amounts of residual carbon gradually react with the remaining oxygen, thereby creating a substantially oxygen-free recycle. Such a treatment removes the last traces of harmful water from the catalyst and makes it ready for the next processing period.

As will be evident from the above, the present process is advantageous in the treatment of feeds normally containing sulfur impurities, such in particular as various petroleum fractions. According to a preferred embodiment of the invention, however, the process is applied to the treatment of organic materials wherein the concentration, and preferably also the type, of sulfur in the feed is carefully controlled as above described. Thus, a particularly advantageous application of the process of the invention is in the dehydrogenation of ethane, propane, butane and butylene with catalysts comprising chromium oxide supported upon an adsorptive alumina. According to the preferred aspect of the invention, the sulfur content of the feed is adjusted and maintained at between about 0.0006% and 0.05% sulfur by weight. The feed is furthermore preferably dried to a water content below about 0.005% by weight. In such cases where the feed normally contains an excess of sulfur, the sulfur content is reduced to within the specified limits by any of the conventional desulfurization treatments. In such cases where the feed normally is free of sulfur or normally contains less than 0.0006% sulfur, the desired concentration is produced by simply adding the requisite amount of sulfur.

The sulfur content of the feed treated according to the present invention may be in the form of naturally-present sulfur impurities but is preferably in the form of elemental sulfur, a thiophenic sulfur compound, or carbonyl sulfide. These particular types of sulfur, it is found, are particularly advantageous.

In most organic reactants normally containing sulfur, the sulfur is present in the form of hydrogen sulfide and/or mercaptans. These two types of sulfur compounds are the least desirable. According to a preferred aspect of the invention, these sulfur compounds are removed and then the desired amount of one of the above-mentioned more preferred sulfur compounds, for instance thiophene, is added to bring the sulfur content to within the preferred range.

As pointed out above, these catalysts of the class described take up sulfur from the feed. The catalyst therefore becomes more contaminated with sulfur as the process period progresses until an equilibrium concentration is reached, which concentration depends upon the particular catalyst, the reaction conditions and the concentration of sulfur in the feed. If, then, the process period is made shorter than the length of time required to reach this equilibrium concentration of sulfur in the catalyst, it is seen that the disadvantages to be expected due to the addition of sulfur to the feed are largely overcome. This specialized method of operation may be effected according to the process of the present invention with particular advantage.

The process of the invention is illustrated by the following non-limiting example:

A commercial propane fraction was adjusted to a sulfur concentration of 0.03% sulfur. The sulfur was present in the form of ethyl mercaptan. The water content for the propane fraction was 0.01%. This propane was dehydrogenated with a catalyst consisting essentially of chromium oxide (11% chromium) impregnated in an active alumina support. The reaction was effected in 27-chromium steel reaction tubes at a temperature of 1140° F., and at a space velocity of 35. During the treatment the catalyst took up a portion of the sulfur until the sulfur concentration reached about 0.0023 pound per cubic foot of catalyst. Under these conditions this required 40 minutes of processing. The process was therefore effected with 40-minute process periods. At the end of the process periods the catalyst was briefly flushed of residual propane and then treated for 20 minutes with undiluted steam at a temperature of 1140° F. and at a space velocity of 70. 96% of the sulfur contained in the catalyst was converted to hydrogen sulfide and removed. The carbonaceous deposits were then removed from the catalyst in a conventional manner by burning with a substantially dry gas containing a controlled concentration of oxygen. During this burning substantially no sulfur dioxide was found in the regeneration gases. Under the processing conditions hitherto used all of the sulfur removed by this steam treatment is converted to sulfur dioxide and is found in the regeneration gases, and if these are recycled, the sulfur dioxide quickly reaches prohibitive concentrations. After the burning treatment the catalyst was flushed thoroughly with a substantially dry inert gas and then used in the subsequent process period. No detrimental effects on the conversion due to the treatment with steam were apparent. Similar advantageous results were obtained when the ethyl mercaptan in the propane was substituted by thiophene or by elemental sulfur.

We claim as our invention:

1. In a catalytic dehydrogenation process using a water-sensitive heavy metal oxide dehydrogenation catalyst wherein carbonaceous deposits are periodically removed from the catalyst by burning with an oxygen-containing gas, the method of obtaining a substantially sulfur-free product while avoiding contamination of the catalyst by iron and while preventing damage to the catalyst by sulfur dioxide in the periodic regeneration by a burning treatment, which comprises maintaining between 0.0006 and 0.05% sulfur in the feed to be hydrogenated discontinuing the process before the catalyst is saturated with sulfur under the reaction conditions, then removing sulfur as hydrogen sulfide from the catalyst to a concentration between 0.001 and 0.005 pound per cubic foot by reaction with water vapor prior to said burning treatement.

2. In a process for the catalytic dehydrogenation of a hydrocarbon using a water-sensitive heavy metal oxide dehydrogenation catalyst wherein carbonaceous deposits are periodically removed from the catalyst by burning with an oxygen-containing gas, the method of obtaining a substantially sulfur-free product while avoiding contamination of the catalyst by iron and while preventing damage to the catalyst by sulfur dioxide in the periodic regeneration by a burning treatment, which comprises maintaining between 0.0006 and 0.05% sulfur in the hydrocarbon feed to be dehydrogenated, discontinuing the process before the catalyst is saturated with sulfur under the reaction conditions, then removing sulfur as hydrogen sulfide from the catalyst to a concentration between 0.001 and 0.005 pound per cubic foot by reaction with water vapor prior to said burning treatment.

3. In a catalytic dehydrogenation process using a water-sensitive dehydrogenation catalyst comprising chromium oxide and alumina, wherein carbonaceous deposits are periodically removed from the catalyst by burning with an oxygen-containing gas, the method of obtaining a substantially sulfur-free product while avoiding contamination of the catalyst by iron and while preventing damage to the catalyst by sulfur dioxide in the periodic regeneration by a burning treatment, which comprises maintaining between 0.0006 and 0.05% sulfur in the feed to be dehydrogenated, discontinuing the process before the catalyst is saturated with sulfur under the reaction conditions, then removing sulfur as hydrogen sulfide from the catalyst to a concentration between 0.001 and 0.005 pound per cubic foot by reaction wtih water vapor prior to said burning treatment.

4. In a catalystic dehydrogenation process using a water-sensitive heavy metal oxide dehydrogenation catalyst wherein carbonaceous deposits are periodically removed from the catalyst by burning with an oxygen-containing gas, the method of obtaining a substantially sulfur-free product while avoiding contamination of the catalyst by iron and while preventing damage to the catalyst by sulfur dioxide in the periodic regeneration by a burning treatment, which comprises maintaining between 0.0006 and 0.05% sulfur in the feed to be dehydrogenated, discontinuing the process before the catalyst is saturated with sulfur under the reaction conditions, then removing between 75 and 95% of the sulfur from the catalyst as hydrogen sulfide by reaction with water vapor prior to said burning treatment.

5. Process according to claim 1 in which the sulfur in the feed is predominantly elemental sulfur.

6. Process according to claim 1 in which the catalyst is subsequently treated with a substantially dry oxygen-free gas to remove the last traces of water.

ROBERT M. COLE.
IRVING I. SHULTZ.